United States Patent [19]
Saida et al.

[11] 3,939,756
[45] Feb. 24, 1976

[54] ROTARY TYPE HYDRAULIC SERVO-MECHANISM

[75] Inventors: Youichi Saida, Kawasaki; Hajime Ito, Yokohama; Kojiro Imanaga, Tokyo, all of Japan

[73] Assignee: Mitsubishi Kinzoku Kabushiki Kaisha, Tokyo, Japan

[22] Filed: Sept. 5, 1974

[21] Appl. No.: 503,518

Related U.S. Application Data

[63] Continuation of Ser. No. 319,019, Dec. 27, 1972, abandoned.

[30] Foreign Application Priority Data

Dec. 27, 1971 Japan.................................. 47-742
Dec. 27, 1971 Japan.................................. 47-743

[52] U.S. Cl................. 91/370; 91/375 R; 91/376 A
[51] Int. Cl.².......................................... F15B 9/10
[58] Field of Search.......... 91/370, 371, 372, 375 R, 91/376 A, 373

[56] References Cited
UNITED STATES PATENTS

| | | | |
|---|---|---|---|
| 1,876,104 | 9/1932 | Tucker................................. | 91/375 |
| 1,947,991 | 2/1934 | Jessup................................. | 91/372 |
| 2,132,486 | 10/1938 | Lichte................................. | 91/375 |
| 2,260,979 | 10/1941 | Morin et al.......................... | 91/375 |
| 2,579,711 | 12/1951 | Staude................................ | 91/370 |

*Primary Examiner*—Paul E. Maslousky
*Attorney, Agent, or Firm*—Wenderoth, Lind & Ponack

[57] ABSTRACT

A rotary type hydraulic servo-mechanism constructed with a hollow-cylindrical casing, an input shaft extending through the casing, a driven output member slidably mounted on the casing, a servo-valve mechanism formed in the surface of the input shaft which slides on the driven output member, a hydraulic fluid chamber to generate a resisting torque against rotational force of the input shaft, and a passage to connect this hydraulic fluid chamber with the servo-valve mechanism, and hydraulic drive chambers defined by a space between the inner wall of the hollow cylindrical casing and the outer periphery of the driven output member.

4 Claims, 7 Drawing Figures

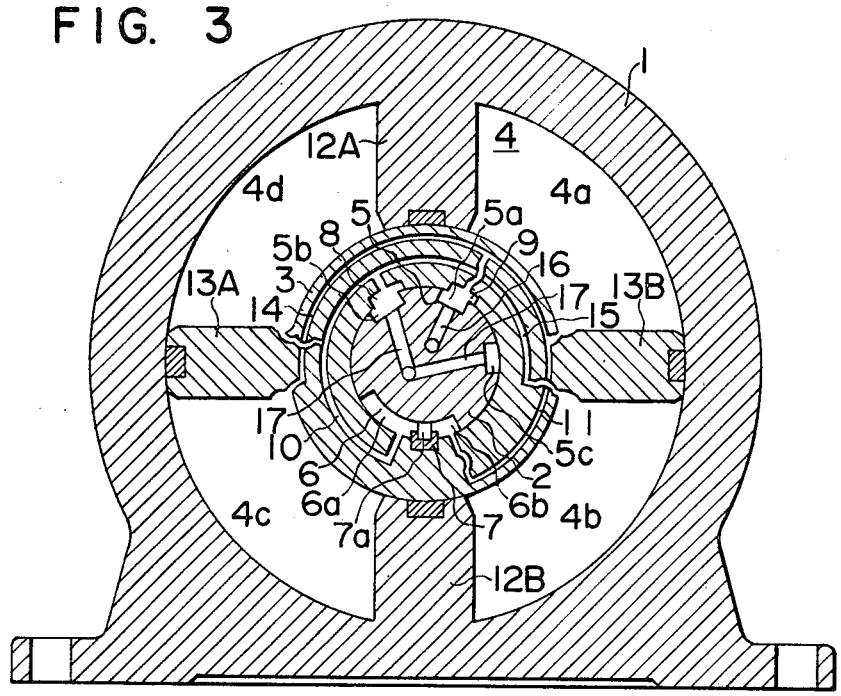
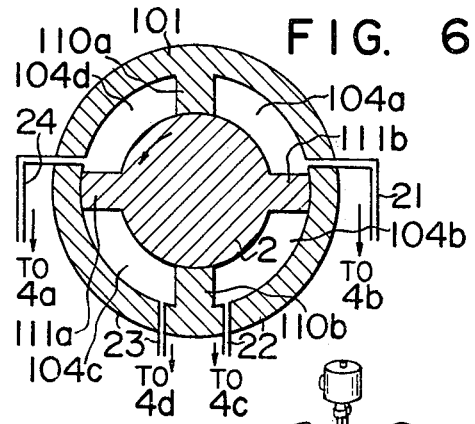
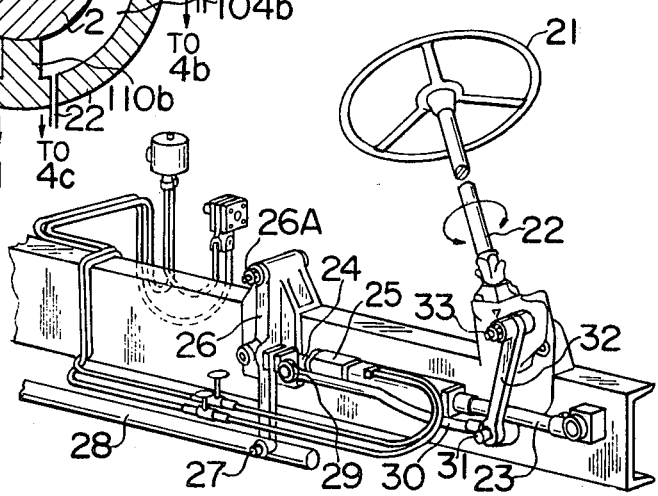

ROTARY TYPE HYDRAULIC SERVO-MECHANISM

This is a continuation of application Ser. No. 319,019, filed Dec. 27, 1972, now abandoned.

BACKGROUND OF THE INVENTION

This invention relates to a rotary type hydraulic servo-mechanism, and, more particularly, it is concerned with a hydraulic rotary servo-mechanism of a type, wherein an oil chamber is provided to cause a torque which hinders rotational force of an input shaft when it is actuated.

There has already been proposed a rotary type hydraulic servo-mechanism which is constructed with a hollow cylindrical casing closed at both open ends thereof by two end blocks and having one or more radially inwardly projecting partition walls on the inner surface thereof, the partition walls extending axially in the casing, an input shaft passing axially and concentrically through the casing, a driven output member rotatably mounted on the input shaft within the casing with one end thereof being extended axially through and out of one of the end blocks as an output portion and having one or more radially outwardly projecting partition walls extending axially from the member, the partition walls of which are installed in such a manner that the outer surfaces thereof are fluid-tightly but slidably movable along the inner surface of the casing, the former and latter partition walls defining therebetween at least two chambers formed between the casing and the output member, a servo-mechanism provided between the opposing sliding surface of the input shaft and the output member, and hydraulic fluid supply and discharge passages connected to the servo-mechanism to supply and discharge hydraulic fluid to and from the chambers under the conrtol of the servo-valve mechanism which operates in response to rotation of the input shaft relative to the output member.

SUMMARY OF THE INVENTION

The purpose of the present invention is to further add an improvement in such already proposed rotary type hydraulic servo-mechanism by providing the same with a device which imparts to the input shaft a torque which hinders rotational force at the time of its rotation, whereby a resisting effect against operation or manipulation of the input shaft as in steering a vehicle, etc. is obtained.

According to the present invention, there is provided a rotary type hydraulic servo-mechanism comprising in combination:

a. a hollow cylindrical casing closed at both open ends thereof by end blocks, and having at least one partition wall radially and inwardly projecting from the inner surface of the casing and extending toward the center axis thereof;

b. an input shaft passing axially and concentrically through the casing;

c. a driven output member rotatably mounted on the input shaft within the casing and having one end extended axially through and out of one of the end blocks as an output portion, and having at least one partition wall radially and outwardly projecting from the outer periphery thereof and extending to the inner surface of the casing, the inner wall surface of the cylindrical casing and the outer periphery of the driven output member in conjunction with the partition walls of the respective casing and output member defining a plurality of hydraulic drive chambers therebetween;

d. a servo-valve mechanism provided between the opposing sliding surfaces of the input shaft and the driven output member, and comprising first longitudinally extending grooves formed in the inner surface of the driven output member, and second longitudinally extending grooves formed in one part of the outer periphery of the input shaft, the first and second grooves being generally in facing relationship with each other;

e. a hydraulic fluid chamber formed on another part of the outer periphery of the input shaft at a position opposite to the servo-mechanism;

f. a separate partition wall provided on the inner surface of the driven output member and projecting inwardly therefrom upto the bottom surface of the hydraulic fluid chamber in a fluid-tight but slidable manner to divide the hydraulic fluid chamber into a plurality of hydraulic sections; and g. hydraulic fluid supplying and discharging passages formed within the driven output member and connected to the servo-mechanism and hydraulic fluid chamber to supply and discharge hydraulic fluid to and from the hydraulic drive chambers and hydraulic fluid chamber under the control of the servo-valve mechanism which operates in response to rotation of the input shaft relative to the driven output member.

According to another aspect of the present invention, there is provided a rotary type hydraulic servo-mechanism comprising in combination:

a. a principal member which comprises:

1. a hollow cylindrical casing closed at both open ends thereof by end blocks, and having at least one partition wall radially and inwardly projecting from the inner surface of the casing and extending toward the center axis thereof;
2. an input shaft passing axially and concentrically through the casing;
3. a driven output member rotatably mounted on the input shaft within the casing and having one end being extended axially through and out of one of the end blocks as an output portion, and having at least one partition wall radially and outwardly projecting from the outer periphery thereof and extending to the inner surface of the casing, the inner wall surface of the cylindrical casing and the outer periphery of the driven output member in conjunction with the partition walls of the respective casing and output member defining a plurality of hydraulic drive chambers therebetween;
4. a servo-valve mechanism provided between the opposing sliding surfaces of the input shaft and the driven output member, and comprising first longitudinally extending grooves formed in the inner surface of the driven output member, and second longitudinally extending grooves formed in one part of the outer periphery of the input shaft, the first and second grooves being generally in facing relationship with each other;
5. hydraulic fluid supplying and discharging passages formed within the driven output member and connected to the servo-mechanism to supply and discharge hydraulic fluid to and from the hydraulic drive chambers under the control of the servo-valve mechanism which operates in response to rotation of the input shaft relative to the driven output member; and b. an auxiliary member which comprises:

1. a hollow cylindrical casing closed at both open ends thereof by end blocks, and having at least one partition wall radially and inwardly projecting from the inner surface of the casing and extending toward the center axis thereof, such casing being connected to the hollow cylindrical casing of the principal member in axial alignment therewith, and accommodating therewithin an extended part of the input shaft which extends through one of the end blocks of the hollow cylindrical casing of the principal member;

2. at least one partition wall provided on the input shaft which projects radially and outwardly from the outer periphery thereof and extends upto the inner surface of the casing of the auxiliary member, the inner wall surface of the cylindrical casing and the outer periphery of the input shaft in conjunction with the partition walls of the respective casing and the input shaft defining a plurality of hydraulic drive chambers therebetween; and 3. hydraulic fluid passages communicating between each of the hydraulic drive chambers of the auxiliary member and each of the hydraulic drive chambers of the principal member.

BRIEF DESCRIPTION OF THE DRAWINGS

The above-described objects, construction, and operation of the present invention will become more apparent from the following detailed description of the invention when read in conjunction with the accompanying drawings, wherein:

FIG. 3 is another cross-sectional view of the servo-mechanism shown in FIG. 1 to indicate a state of connection between the feeding source of pressurized fluid and discharging fluid passages when the input shaft and the driven output member of the device are rotated in one direction;

FIG. 6 is another vertical cross-sectional view of the device shown in FIG. 4 taken along the plane indicated by the line VI—VI; and FIG. 7 is a perspective view showing one example of an application of the rotary type hydraulic servo-mechanism and counter-torque generating device fitted on a steering device of an automotive vehicle.

DETAILED DESCRIPTION OF THE INVENTION

The construction and operation of the rotary type hydraulic servo-mechanism according to the present invention will now be described with reference to one embodiment thereof in conjunction with FIGS. 1, 2, and 3.

Figure 1:
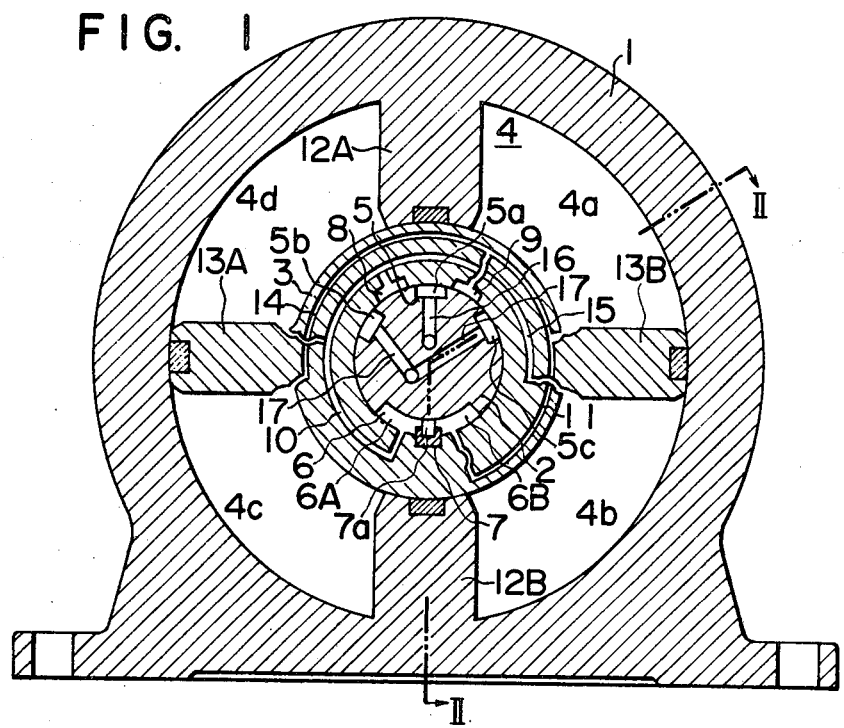
FIG. 1 is a vertical cross-sectional view of one embodiment of the rotary type hydraulic servo-mechanism according to the present invention.
Figure 2:
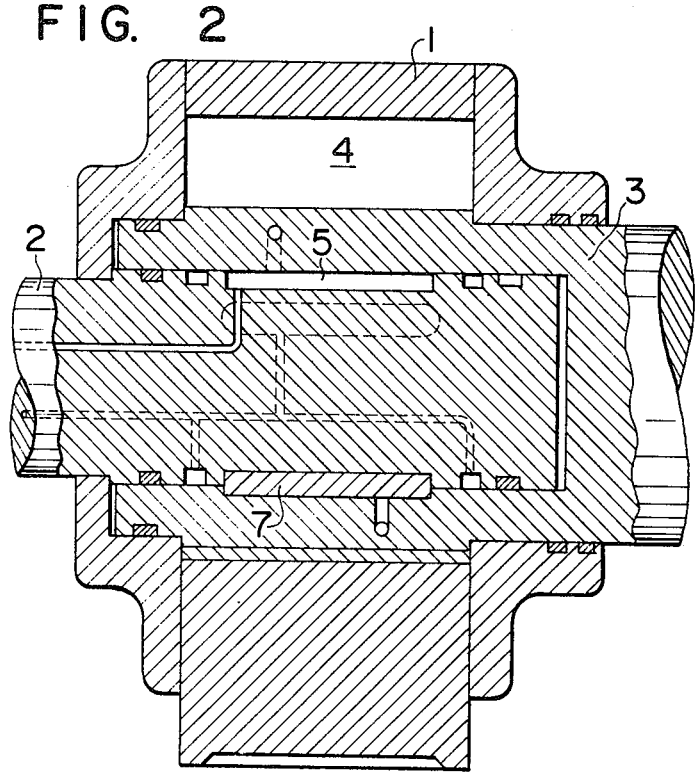
FIG. 2 is a longitudinal cross-section of the servo-mechanism shown in FIG. 1 cut along the line II—II.

Referring to FIG. 1, the rotary type hydraulic servo-mechanism is basically constructed with a hollow cylindrical casing 1, both ends of which are closed by end blocks, and input shaft 2 inserted into the casing 1 in its longitudinal direction and concentrically along its central axis, and a sleeve-like inner rotor (or driven output member) 3 mounted on the outer periphery of the input shaft 2 in a freely rotatably manner. The driven output member 3 rotates within the hollow cylindrical casing 1 along, and in oil-tight contact with, the end portions of a pair of partition walls 12A and 12B which project from the inner surface of the casing toward the central axis thereof and are disposed 180 degrees apart from each other on a diametral line thereof. The driver output member 3 is further provided with a pair of partition walls 13A and 13B integrally on the outer periphery thereof which walls slidably move along the inner wall of the casing 1. These pairs of partition walls 12A, 12B, and 13A, 13B provided on the hollow cylindrical casing 1 and the driven output member 3 define four independent hydraulic drive chambers 4a, 4b, 4c, and 4d within an annular space 4 between the inner surface of the casing 1 and the outer surface of the driven output member 3.

The input shaft 2 is provided on its outer periphery with a servo-valve 5 which essentially comprises three longitudinal grooves 5a, 5b, and 5c. The groove 5a serves as a feeding passage for pressurized oil, and is connected to a pressurized oil feeding source (not shown) such as an oil feeding pump, etc. by way of an appropriate pressurized oil passage 16 bored within the input shaft 2. The remaining grooves 5b and 5c are for discharging pressurized oil, and are connected to a pressurized oil discharging tank (not shown) by way of pressurized oil passages 17.

The driven output member 3 is provided with two grooves 8 and 9 on its inner surface slidably contacting the outer periphery of the input shaft 2. The groove 8 communicates with a pair of mutually opposing hydraulic drive chambers 4b and 4d through a pressurized oil passage 15, while the groove 9 communicates with a pair of mutually opposing hydraulic drive chambers 4a and 4c through a pressurized oil passage 14.

Now, the input shaft 2 is rotated to displace the positions of the grooves 5a, 5b and 5c from those shown in FIG. 1 to those in FIG. 3. The groove 5a which is the pressurized oil feeding passage meets with the groove 9 on the driven output member 3 to communicate with the hydraulic drive chambers 4a and 4c through the oil passage 14, whereby pressurized oil is fed into these hydraulic drive chambers. On the other hand, the groove 5b meets with the groove 8 on the driven output chamber 3 in order to communicate with the hydraulic drive chambers 4b and 4d, whereby the pressurized oil in these cambers is discharged therefrom. In this consequence, the driven output member 3 is rotated in the clockwise direction.

The rotary type hydraulic servo-mechanism according to the present invention if further characterized in that a hydraulic chamber 6 is provided on the outer periphery of the input shaft 2. The hydraulic chamber 6 is positioned distant from the servo-valve 5, e.g., it is disposed at a position just opposite the servo-valve 5, and is divided into two sections 6A and 6B by a partition wall 7 provided on the inner surface of the driven output member 3. The partition 7 is further provided on its extreme end part with an oil seal to maintain close contact between the partition wall and the bottom surface of the hydraulic chamber in an oil-tight manner.

A pressurized oil passage 11 is bored in one part of the driven output member 3, as shown in FIGS. 1 and 3, one end of which is connected to the afore-mentioned pressurized oil passage 14 communicating to the groove 9, and the other end of which is open to the section 6B of the hydraulic chamber 6. In the same way, a pressurized oil passage 10 is bored in another part of the driven output member 3, one end of which is connected to the afore-said pressurized oil passage 15 communicating with the groove 8, and the other end of which is open to the section 6A of the hydraulic chamber 6.

The position of the hydraulic chamber 6 shown in FIG. 1 indicates that pressurized oil is neither being fed into the divided sections 6A and 6B, nor it is being discharged therefrom. However, at the position of the hydraulic chamber shown in FIG. 3, wherein the input shaft 2 is rotated in the clockwise direction, the divided section 6B is able to communicate with the pressurized oil feeding passage 5a of the servo-valve 5 through the passages 11, 14 and the groove 9. Consequently, there is generated a high pressure in the divided section 6B, while the input shaft 2 is rotated in such direction that reduces the volume of the divided section 6B, with the result that the pressurized oil in this section 6B of the hydraulic chamber 6 generates a torque which functions to hinder further rotation of the input shaft in the clockwise direction. On the other hand, the divided section 6A communicates with the pressurized oil discharging passage 5b of the servo-valve 5 through the passages 10, 15, and the groove 8 with the result that there occurs a negative pressure in this section 6A. Further rotation of the input shaft 2 in the clockwise direction tends to cause the divided section 6A of the hydraulic chamber 6 to expand its volume, and the negative pressure generated in this section 6A further increases accordingly. This negative pressure also generates torque which prevents the input shaft 2 from further clockwise rotation.

As explained in the foregoing, when the hydraulic chamber 6 and partition wall 7 which divides this chamber into two sections are respectively provided on the outer periphery of the input shaft 2 and the inner surface of the driven output member 3, and the hydraulic chamber 6 is made to communicate with the pressurized oil passages formed within the driven output member 3, a resisting effect against rotation of the input shaft can be obtained. If required, this hydraulic chamber 6 can be formed on the inner surface of the driven output member 3, and the partition wall 7 on the outer periphery of the input shaft 2.

Another embodiment of the present invention will now be explained with reference to FIGS. 4, 5, and 6.

Figure 4:
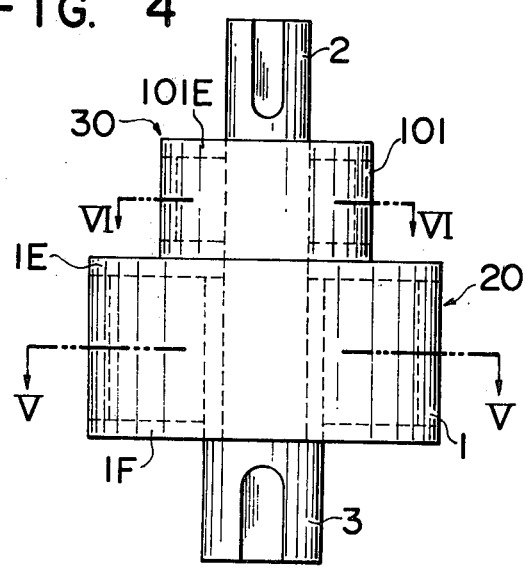
FIG. 4 is a side elevational view of another embodiment of the rotary type hydraulic servo-mechanism according to the present invention.

Referring now FIG. 4, the rotary type hydraulic servo-mechanism in this embodiment is basically constructed with a main body 20 of a similar structure as shown in FIG. 1, an auxiliary body 30, an input shaft 2 which passes through and extends upto one end of the main body, and a sleeve-like inner rotor (or driven output member) 3 which spans both ends of the main body 20. The auxiliary body 30 is to impart to the input shaft 2 in the principal body 20 a counter-torque which gives a resisting effect in the course of steering operation.

Figure 5:
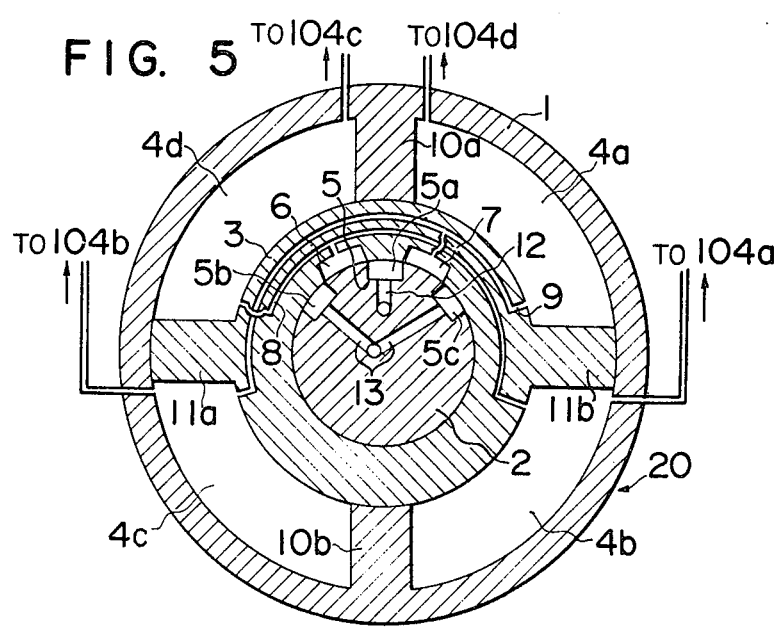
FIG. 5 is a vertical cross-sectional view of the device shown in FIG. 4 taken along the plane indicated by the line V—V.

As shown in FIGS. 4 and 5, the principal body 20 is constructed with a primary hollow cylindrical casing 1 closed at both ends thereof with end blocks and having a pair of partition walls 10a and 10b which project from the inner surface of the casing toward the center axis thereof and are disposed 180° apart from each other on a diametral line thereof, an input shaft 2 which extends in the longitudinal direction of the casing 1 concentrically along the center axis thereof, and passes through one end block 1B of the casing 1, and a sleeve-like inner rotor (or a driven output member) 3 mounted on the outer periphery of the input shaft in a freely rotatable manner and extending through the other end block 1F of the casing 1.

The sleeve-like inner rotor (or driven output member) 3 contacts oil-tightly with the end surface of the partition walls 10a and 10b, along which it slides. The driven output member 3 is further provided with a pair of partition walls 11a and 11b integrally positioned on the outer periphery thereof and extending outwardly in the radial direction upto the inner wall of the casing 1, and slidably movable along such inner wall.

These pairs of partition walls 10a, 10b, and 11a, 11b provided on the hollow cylinder casing 1 and the driven output member 3 define four independent hydraulic drive chambers 4a, 4b, 4c, and 4d within the annular space between the inner surface of the casing 1 and the outer surface of the driven output member 3. The driven output member 3 is provided with two grooves 6 and 7 on its inner surface slidably contacting the outer periphery of the input shaft 2. The groove 6 communicates with a pair of mutually opposing hydraulic drive chambers 4b and 4d through a pressurized oil passage 8, while the groove 7 communicates with a pair of mutually opposing hydraulic drive chambers 4a and 4c through a pressurized oil passage 9.

The input shaft 2 is provided on its outer periphery with a servo-valve 5 which essentially comprises three longitudinal grooves 5a, 5b, and 5c. The groove 5a serves as a feeding passage for pressurized oil, and is connected to a pressurized oil feeding source (not shown) such as an oil feeding pump, etc. by way of an appropriate pressurized oil passage 12 bored within the input shaft 2. The remaining grooves 5b and 5c are for discharging pressurized oil, and are connected to a pressurized oil discharging tank (not shown) by way of pressurized oil passages 13.

In the actual operation of this device, when the input shaft 2 is rotated to displace the position of the grooves 5a, 5b and 5c from those shown in FIG. 5 in the clockwise direction, the groove 5a which is the pressurized oil feeding passage is aligned the groove 7 on the driven output member 3 to communicate with the hydraulic drive chambers 4a and 4c through the pressurized oil passage 9, whereby pressurized oil is fed into these hydraulic drive chambers. On the other hand, the groove 5b is aligned with the groove 6 on the driven output member 3 to communicate with the hydraulic drive chambers 4b and 4d, whereby the pressurized oil in these chambers is discharged therefrom. Consequently, pressure within the hydraulic drive chambers 4a and 4c is augmented, while pressure within the hydraulic drive chambers 4b and 4d decreases with the result that the driven output member 3 rotates in the clockwise direction. Conversely when the input shaft 2 is rotated in the anit-clockwise direction from its position shown in FIG. 5, the pressurized oil feeding passage 5a of the servo-valve 5 is aligned with the groove 6 on the driven output member 3, and the groove 5c which is the pressurized oil discharging passage is aligned with the groove 7. Consequently, pressure within the hydraulic drive chambers 4b and 4d increases, while pressure in the hydraulic drive chambers 4a and 4c decreases with the result that the driven output member 3 rotates in the anticlockwise direction. In this way, the driven output member 3 rotates in the same direction as that of the input shaft 2 following its rotation, whereupon rotational torque of the driven output member 3 is augmented.

The rotary type hydraulic servo-mechanism in this embodiment is characterized in having the auxiliary body 30 connected to the main body 20 of the aforedescribed construction and operation.

As shown in FIG. 6, a secondary hollow cylindrical casing 101 is fixed to the primary hollow cylindrical casing 1 of the main body 20 in axial alignment therewith. The input shaft 2 pierces the end block 101E of the secondary hollow cylindrical casing 101 with one end thereof protruding outside of the casing. The casing 101 is provided with a pair of partition walls 110a and 110b projecting inwardly from the inner wall thereof toward the center axis thereof, and the end surface of each of these partition walls contacts oil-tightly with the outer periphery of the input shaft 2. On the other hand, the input shaft 2 is also provided with a pair of partition walls 111a and 111b integrally mounted on the outer periphery thereof and radially projecting outwardly therefrom. The partition walls 111a and 111b contact oil-tightly at their end surface with the inner wall of the secondary hollow cylindrical casing 101 in a slidable manner.

These pairs of partition walls 110a, 110b, and 111a, 111b provided on the secondary hollow cylindrical casing 101 and the input shaft 2, respectively, define four independent hydraulic drive chambers 104a, 104b, 104c and 104d within the annular space between the inner surface of the hollow cylindrical casing 101 and the outer surface of the input shaft 2. These independent hydraulic drive chambers 104a, 104b, 104c, and 104d are connected individually to the hydraulic drive chambers 4b, 4c, 4d, and 4a, respectively, of the primary hollow cylindrical casing 1 of the main body 20 through appropriate conduits or pipings 21, 22, 23, and 24.

In the actual operation, when the input shaft 2 is rotated in the clockwise direction, the quantity of pressurized oil in the hydraulic drive chambers 4a and 4c increases, and that in the chambers 4b and 4d decreases as already described above. With this change in the oil quantity in the primary hollow cylindrical casing 1, the quantity of the pressurized oil in the hydraulic drive chambers 104b and 104d in the secondary hollow cylindrical casing 101 increases and that in the chambers 104a and 104c decreases. Consequently, the input shaft 2 receives a torque which tends to rotate the shaft in the anti-clockwise direction through the partition walls 111a and 111b. In other words, when the input shaft is to be rotated, it receives a torque which hinders rotation in its designated direction, hence a resisting effect against the steering operation through the input shaft can be obtained.

In the embodiment shown in FIGS. 5 and 6, four independent hydraulic drive chambers are formed within the respective hollow cylindrical casings 1 and 101. However, the number of the hydraulic drive chambers are not necessarily limited to four, but they can be properly determined depending on necessity. Also, the conduits to connect the hydraulic drive chambers in both cylinderical casings may be properly changed depending on the situation. The input shaft 2 may also be disposed separately in each of the casings 1 and 101, after which both can be fixedly joined.

FIG. 7 shows a conventional steering device, in which the rotary type hydraulic servo-mechanism is equipped as an expedient to impart an appropriate resisting effect against rotation of the steering wheeel as an input shaft.

In more detail, rotation of the steering wheel 21 is transmitted to a hydraulic control valve 25 through a steering axle 22, worm wheel mechanism (not shown), and a connecting rod 30, thereby actuating the hydraulic servo-mechanism 24. A swing lever 26 is swingably fitted on a pivotal axis 26A, and swings on this pivot depending on the position of the hydraulic servo-mechanism 24, whereby an actuating lever 28 pivotally connected to the lower end of the swing lever 26 causes the front wheels of a vehicle to rotate left or right. At this time, reacting chamber (not shown) is provided within the hydraulic control valve 25 to produce a hydraulic pressure to prevent movement of a spool valve (not shown) which slidemoves depending on movement of the connecting rod 30, the hydraulic pressure of which is designated to be transmitted to the steering axle 22. The mutually numeral 23 denotes a horizonal rod to maintain the hydraulic servo-mechanism in a freely slidable manner. means

What we claim is:

1. In a rotary type hydraulic servo-mechanism of the type including a hollow cylindrical casing closed at both ends thereof and having at least one partition wall radially and inwardly projecting from the inner surface of said casing and extending toward the center axis thereof; a cylindrical input shaft passing axially and concentrically through said casing; a driven output member rotatably mounted on said input shaft within said casing and having one end thereof extending out of the casing as an output portion, and having at least one partition wall radially and outwardly projecting from the outer periphery thereof and extending toward the inner surface of said casing; said partition walls of said casing and said output member defining therebetween at least one pair of hydraulic drive chambers; a servovalve mechanism provided between opposed cylindrical sliding surfaces of said input shaft and said output member and comprising mutually opposed axial grooves formed in the cylindrical outer surface of said input shaft and in the cylindrical inner surface of said output member; first hydraulic fluid supplying and discharging passage means formed in said input shaft and connecting said grooves in said input shaft to a hydraulic fluid source and a fluid reservoir; second hydraulic fluid supplying and discharging passage means formed in said output member and connecting said grooves in said output member to said hydraulic drive chambers; and means for generating a counter-torque against a rotational force applied to said input shaft; the improvement wherein said means for generating a counter-torque comprises:

means positioned around said input shaft and comprising at least one pair of isolated hydraulic fluid reaction chambers which are hydraulically isolated from one another;

said reaction chambers being formed at a side of said input shaft diametrically opposite to said servovalve mechanism and communicating with said second hydraulic fluid supplying and discharging passage means through passage means formed in said output member;

each of said reaction chambers being defined by a first radial face on a first radial wall formed on said input shaft and a second radial face on a second radial wall circumferentially opposing the first radial face and formed on said output member;

said first and second walls having their radially outer and inner ends in sliding sealed engagement with the inner surface of said output member and with an outer surface of said input shaft, respectively;

said first and second radial faces having the same area; and said pair of reaction chambers comprising a first reaction chamber for imposing to said input shaft a torque counteracting the rotation of said input shaft in a first circumferential direction, and a second reaction chamber for imposing to said input shaft a torque counteracting the rotation of said input shaft in a second opposite circumferential direction, whereby upon introduction of hydraulic fluid into one of said reaction chambers a reaction force is exerted on said input shaft against and relative to said output member for causing relative rotation between said input shaft and said output member.

2. The improvement claimed in claim 1, wherein said hydraulic fluid reaction chambers are permanently isolated from each other.

3. The improvement claimed in claim 1, wherein said input shaft has a circumferential recess in the outer surface thereof, the circumferentially opposite walls of said recess comprising said first radial walls; and further comprising partitioning means projecting radially inwardly from the inner surface of said output member into said recess to divide the interior of said recess into said first and second reaction chambers, the circumferentially opposite walls of said partitioning means comprising said second radial walls.

4. The improvement claimed in claim 1, further comprising an axuiliary member comprising:

a hollow cylindrical auxiliary casing closed at both open ends thereof by end blocks, and having at least one partition wall radially and inwardly projecting from the inner surface of said auxiliary casing and extending toward the center axis thereof, said auxiliary casing being connected to said hollow cylindrical casing in an axial alignment therewith, and said axuiliary casing accommodating therewithin an extended part of said input shaft which extends through one of the end blocks of said hollow cylindrical casing;

at least one partition wall provided on said input shaft projecting radially and outwardly from the outer periphery thereof and extending upto the inner surface of auxiliary casing;

the inner wall surface of said auxiliary cylindrical casing and the outer periphery of said input shaft in conjunction with said partition walls of said respective auxiliary casing and the input shaft defining a plurality of auxiliary hydraulic drive chambers therebetween; and hydraulic fluid passages communicating between each of said auxiliary hydraulic drive chambers and each of said hydraulic drive chambers.

* * * * *